US012482469B2

(12) United States Patent
Park et al.

(10) Patent No.: US 12,482,469 B2
(45) Date of Patent: Nov. 25, 2025

(54) ELECTRONIC DEVICE AND METHOD FOR PROCESSING SPEECH BY CLASSIFYING SPEECH TARGET

(71) Applicant: SAMSUNG ELECTRONICS CO., LTD., Suwon-si (KR)

(72) Inventors: Minjung Park, Suwon-si (KR); Chulkwi Kim, Suwon-si (KR); Juyoung Yu, Suwon-si (KR); Nammin Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/123,509

(22) Filed: Mar. 20, 2023

(65) Prior Publication Data

US 2023/0230593 A1    Jul. 20, 2023

Related U.S. Application Data

(63) Continuation of application No. PCT/KR2022/008593, filed on Jun. 17, 2022.

(30) Foreign Application Priority Data

Aug. 27, 2021   (KR) .................. 10-2021-0113794

(51) Int. Cl.
*G10L 15/25* (2013.01)
*G06V 20/50* (2022.01)
(Continued)

(52) U.S. Cl.
CPC .............. *G10L 15/25* (2013.01); *G06V 20/50* (2022.01); *G06V 40/171* (2022.01); *G06V 40/20* (2022.01);
(Continued)

(58) Field of Classification Search
CPC ......... G10L 15/25; G10L 15/28; G10L 15/22; G10L 15/26; G10L 15/04; G10L 15/063;
(Continued)

(56) References Cited

U.S. PATENT DOCUMENTS 6,185,529 B1    2/2001    Chen et al.
8,913,103 B1   12/2014    Sargin et al.
(Continued)

FOREIGN PATENT DOCUMENTS

JP    2004-118314        4/2004
JP    2012-029209 A      2/2012
(Continued)

OTHER PUBLICATIONS

International Search Report for PCT/KR2022/008593 mailed Sep. 15, 2022, 4 pages.
(Continued)

*Primary Examiner* — Yogeshkumar Patel
(74) *Attorney, Agent, or Firm* — NIXON & VANDERHYE P.C.

(57) ABSTRACT

Various embodiments of the disclosure provide a method and a device which includes multiple cameras arranged at different positions, multiple microphones arranged at different positions, a memory, and a processor operatively connected to at least one of the multiple cameras, the multiple microphones, and the memory, wherein the processor is configured to: determine, using at least one of the multiple cameras, whether at least one of a user wearing the electronic device or a counterpart having a conversation with the user makes an utterance, configure directivity of at least one of the multiple microphones based on the determination, obtain an audio from at least one of the multiple microphones based on the configured directivity, obtain an image including a mouth shape of the user or the counterpart from at least one of the multiple cameras, and process speech of an utterance target in a different manner based on the obtained audio and the image.

14 Claims, 8 Drawing Sheets

(51) Int. Cl.
  *G06V 40/16* (2022.01)
  *G06V 40/20* (2022.01)
  *G10L 15/22* (2006.01)
  *G10L 15/26* (2006.01)
  *H04N 23/90* (2023.01)
  *H04R 1/40* (2006.01)
  *H04R 3/00* (2006.01)

(52) U.S. Cl.
  CPC .............. *G10L 15/22* (2013.01); *G10L 15/26* (2013.01); *H04N 23/90* (2023.01); *H04R 1/406* (2013.01); *H04R 3/005* (2013.01); *G10L 2015/223* (2013.01)

(58) Field of Classification Search
  CPC ..... G10L 21/0272; G10L 17/04; G10L 17/10; G10L 2015/223; G10L 2021/02166; G10L 2015/225; G10L 2015/226; H04N 23/90; H04N 7/18; H04N 7/181; H04R 1/406; H04R 3/005; G06V 20/50; G06V 40/171; G06V 40/16; G06V 40/02; G06F 3/01; G06F 3/013
  See application file for complete search history.

(56) References Cited

U.S. PATENT DOCUMENTS

| | | | |
|---|---|---|---|
| 10,665,243 B1 | 5/2020 | Whitmire et al. | |
| 2015/0161992 A1* | 6/2015 | Jung | G10L 15/20 704/251 |
| 2020/0193992 A1* | 6/2020 | Kim | H04N 23/60 |
| 2020/0296521 A1* | 9/2020 | Wexler | G06F 3/167 |
| 2021/0035586 A1* | 2/2021 | Cech | G06T 7/254 |
| 2021/0103426 A1 | 4/2021 | Heo | |
| 2021/0110815 A1* | 4/2021 | Maeng | G06F 40/30 |
| 2021/0151058 A1 | 5/2021 | Cheung et al. | |
| 2021/0327447 A1 | 10/2021 | Maeng et al. | |
| 2024/0013252 A1 | 1/2024 | Box | |

FOREIGN PATENT DOCUMENTS

| | | | | |
|---|---|---|---|---|
| JP | 5294315 | | 6/2013 | |
| JP | 5666219 | | 12/2014 | |
| JP | 2020-126492 | | 8/2020 | |
| JP | 2020-187346 | | 11/2020 | |
| JP | 2020187346 A | * | 11/2020 | ............. G06V 40/16 |
| KR | 10-2000-0022761 | | 4/2000 | |
| KR | 10-2006-0044008 | | 5/2006 | |
| KR | 10-2015-0087017 | | 7/2015 | |
| KR | 10-1894422 B1 | | 9/2018 | |
| KR | 10-2019-0121720 | | 10/2019 | |
| KR | 10-2020-0129934 | | 11/2020 | |
| WO | 2019/150708 | | 8/2019 | |

OTHER PUBLICATIONS

Written Opinion of the ISA for PCT/KR2022/008593 mailed Sep. 15, 2022, 4 pages.
Extended European Search Report dated Jul. 16, 2024 issued in European Patent Application No. 22861522.5.
European Patent Office (EPO) Action dated Oct. 23, 2025 for European patent application 22 861 522.5-1207.

* cited by examiner

ELECTRONIC DEVICE AND METHOD FOR PROCESSING SPEECH BY CLASSIFYING SPEECH TARGET

CROSS-REFERENCE TO RELATED APPLICATIONS

This application is a continuation of International Application No. PCT/KR2022/008593 designating the United States, filed on Jun. 17, 2022, in the Korean Intellectual Property Receiving Office and claiming priority to Korean Patent Application No. 10-2021-0113794, filed on Aug. 27, 2021, in the Korean Intellectual Property Office, the disclosures of which are incorporated by reference herein in their entireties.

BACKGROUND

Field

The disclosure relates to a method and a device for processing a speech by distinguishing an utterance target.

Description of Related Art

In line with development of digital technologies, there has been widespread use of various kinds of electronic devices such as a mobile communication terminal, personal digital assistant (PDA), an electronic wallet, a smartphone, a table personal computer (PC), and a wearable device. The hardware part and/or software part of such electronic devices have been continuously improved to support and enhance the functionality thereof.

For example, an electronic device may connect to a laptop, a wireless audio output device (for example, earphone, headphone), or a wearable display device using near-field wireless communication such as Bluetooth or Wi-Fi Direct, and may output or exchange information (or contents). For example, an electronic device may connect to a wireless audio output device through near-field communication and may output music or video sounds through the wireless audio output device. A wearable display device may include AR glasses, smart glasses, or a head mounted device (for example, head mounted display (HMD)). An electronic device may connect to a wearable display device and may output, through the wearable display device, various contents to which technologies regarding extended reality (XR) such as virtual reality (VR), augmented reality (AR), and/or mixed reality (MR). For example, the wearable display device may superimpose (or overlay) various digital contents (for example, virtual images) onto the real world, thereby providing a single image.

When a user converses with a counterpart while wearing a wearable display device, the wearable display device may acquire both the user's speech (or utterance) and the counterpart's speech. A conventional wearable display device processes the user's speech and the counterpart's speech as a single speech signal, and the speech recognition rate may thus be low.

SUMMARY

Embodiments of the disclosure may provide a method and an apparatus wherein, when a user wearing an electronic device (for example, wearable display device) converses with a counterpart, the user's utterance and the counterpart's utterance are distinguished and processed using different processes.

An electronic device according to various example embodiments of the disclosure may include: multiple cameras arranged at different positions, multiple microphones arranged at different positions, a memory, and a processor operatively connected to at least one of the multiple cameras, the multiple microphones, and the memory, wherein the processor is configured to: determine, using the multiple cameras, whether at least one of a user wearing the electronic device or a counterpart having a conversation with the user makes an utterance, configure directivity of the multiple microphones based on the determination, obtain audio from at least one of the multiple microphones based on the configured directivity, obtain an image including a mouth shape of the user or the counterpart from at least one of the multiple cameras, and process speech of an utterance target in a different manner based on the obtained audio and image.

A method of operating an electronic device according to various example embodiments of the disclosure may include: determining whether at least one of a user wearing the electronic device or a counterpart having a conversation with the user makes an utterance using at least one of multiple cameras arranged at different positions, configuring directivity of at least one of multiple microphones arranged at different positions based on the determination, obtaining an audio from at least one of the multiple microphones based on the configured directivity, obtaining an image including a mouth shape of the user or the counterpart from at least one of the multiple cameras, and processing speech of an utterance target in a different manner based on the obtained audio and image.

According to various example embodiments, when a user wearing an electronic device (for example, wearable display device) converses with a counterpart, the user's utterance and the counterpart's utterance may be distinguished and processed using different processes, thereby improving the speech recognition rate.

According to various example embodiments, multiple cameras included in an electronic device may be used to identify (or check) an utterance target (for example, a user wearing the electronic device or a counterpart conversing with the user), and a different speech recognition process may be applied depending on the utterance target.

According to various example embodiments, when a user or a counterpart conversing with the user alone makes an utterance, a micro beamforming technology may be utilized to process the speech of the utterance target. When the user and the counterpart make simultaneous utterances, the user's utterance is processed by detecting the user's lip shape acquired through a camera, and the counterpart's utterance is processed utilizing the micro beamforming technology. As a result, intermingling of different speeches may be prevented and/or reduced, and the speech recognition rate may be improved according to each utterance.

According to various example embodiments, when a user wearing an electronic device alone makes an utterance, deep learning may be performed by matching the user's speech and the user's mouth shape such that, even if various audio signals are mixed and enter the microphone, the user's utterance can be accurately processed.

According to various example embodiments, a conversation counterpart who converses with a user may be specified based on the user's gaze, and a micro beamforming technology may be applied such that a speech can be acquired from a specific conversation counterpart, thereby easily acquiring the speech from the conversation counterpart.

BRIEF DESCRIPTION OF THE DRAWINGS

The above and other aspects, feature and advantages of certain embodiments of the present disclosure will be more apparent from the following detailed description, taken in conjunction with the accompanying drawings, in which.

DETAILED DESCRIPTION

Figure 1:
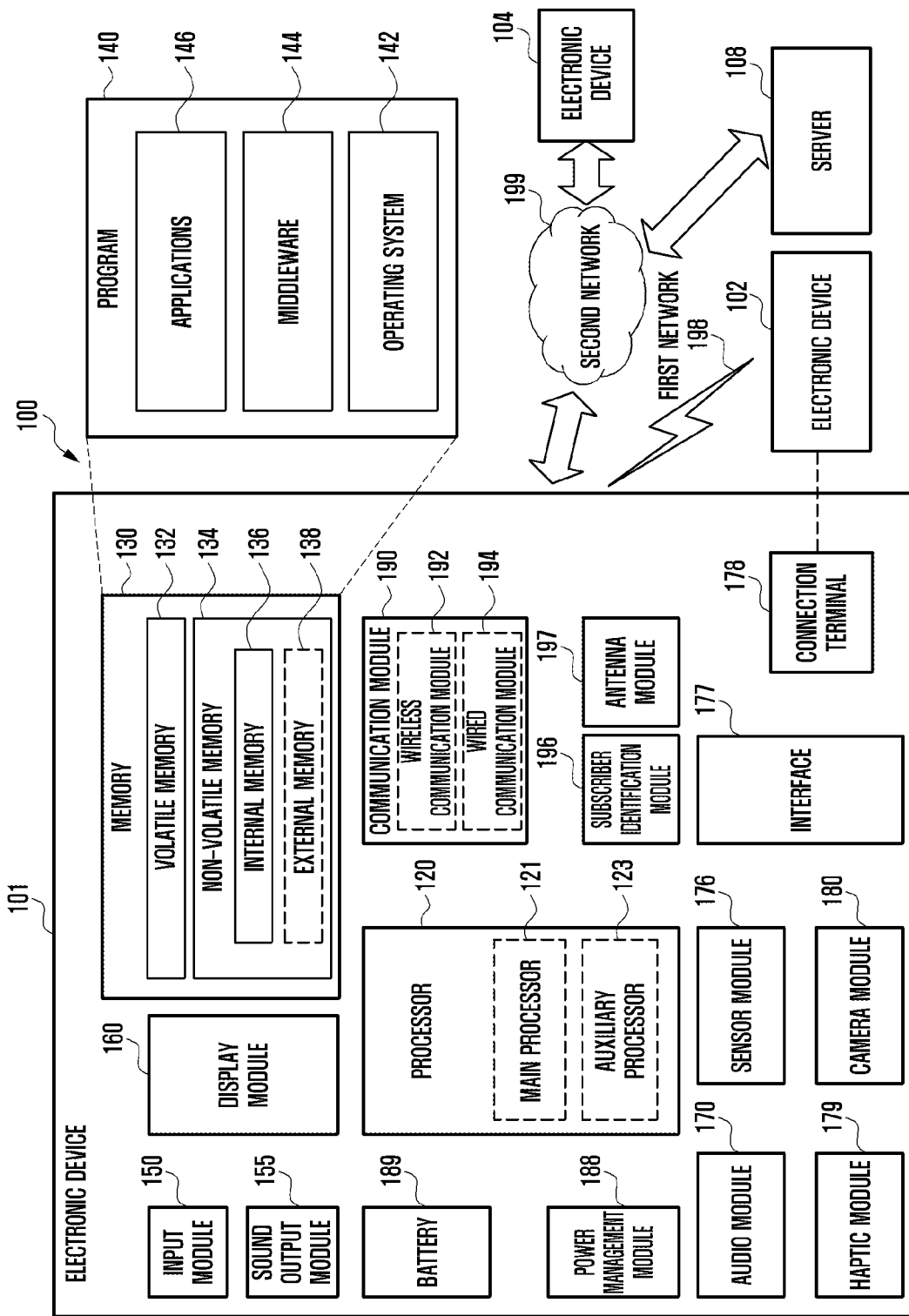
FIG. 1 is a block diagram illustrating an example electronic device in a network environment according to various embodiments.

FIG. 1 is a block diagram illustrating an example electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen). The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency/communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
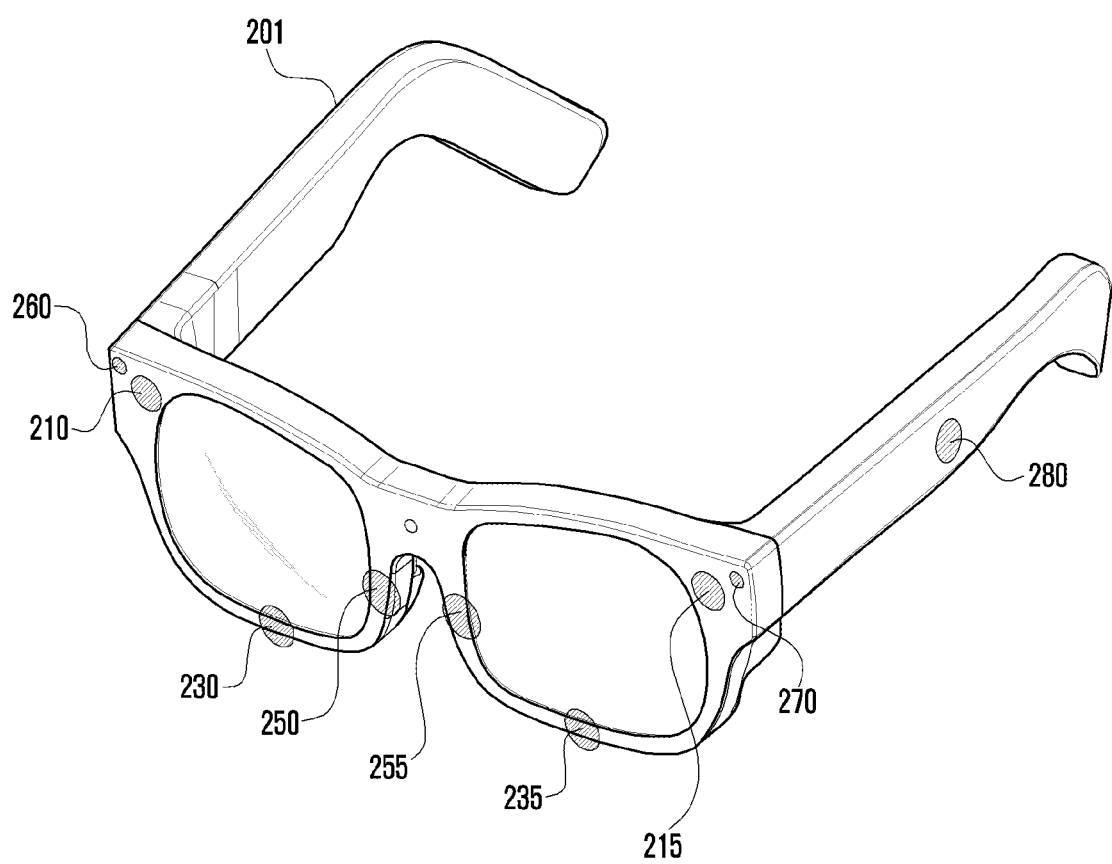
FIG. 2 is a perspective view illustrating an electronic device according to various embodiments.

FIG. 2 is a perspective view illustrating an electronic device according to various embodiments.

Referring to FIG. 2, an electronic device (for example, the electronic device 101 of FIG. 1) according to various embodiments may include a wearable display device 201. The wearable display device 201 may include, for example, and without limitation, AR glasses, smart glasses, a head mounted device (for example, a head mounted display (HMD)), or the like. The wearable display device 201 may include multiple cameras (for example, first cameras 210 and 215, second cameras 230 and 235, and third cameras 250 and 255) arranged at different positions and multiple microphones (for example, a first microphone 260, a second microphone 270, and a third microphone 280) arranged at different positions.

The wearable display device 201 may directly generate (for example, generate based on stored or processed data) relevant data (for example, an AR image) for an AR or VR service, or obtain data from the outside (for example, the electronic device 101 or a server (for example, the server 108 in FIG. 1)) to display through a display (not shown). For example, the wearable display device 201 may be worn on a body part (for example, a face) of a user and display one image through a display by superimposing various digital contents (for example, an AR image) on top of the real world. According to an embodiment, the wearable display device 201 may receive image data (for example, an AR image) from an external electronic device and display the received image data through a display together with real world data.

A user may have a conversation with a counterpart in a state of wearing the wearable display device 201. The wearable display device 201 may identify (or determine) an utterance target using at least one of the first cameras 210 and 215 to the third cameras 250 and 255. The utterance target may be at least one of a user, a counterpart, or a user and a counterpart (for example, the user and the counterpart concurrently utter). The counterpart may be one or more. The wearable display device 201 may determine whether a user wears the wearable display device 201 using a sensor module (for example, the sensor module 176 in FIG. 1).

For example, the sensor module 176 may include a proximity sensor (or illuminance sensor) and disposed on a portion (or surface) of the wearable display device 201 covered by a user when the user wears the wearable display device 201. The determining whether the wearable display device 201 is worn is a well-known technique and thus a detailed description thereof may not be provided. When it is determined that a user wears the wearable display device 201, the wearable display device 201 may obtain an image from the first cameras 210 and 215 to the third cameras 250 and 255 in real time, periodically, or selectively by activating (or driving) the first cameras 210 and 215 to the third cameras 250 and 255.

The wearable display device 201 may identify an utterance target based on the obtained image. For example, the first cameras 210 and 215 may be arranged to be capable of photographing a target that the user is looking at. The first cameras 210 and 215 may be arranged at outer side (for example, front side) of the wearable display device 201 corresponding to a diagonally up direction from left/right eyes of the user. For example, when the user wears the wearable display device 201, a (1-1)th camera 210 may be disposed on the right corresponding to the right eye among two eyes of the user, and a (1-2)th camera 215 may be disposed on the left corresponding to the left eye among two eyes of the user. The first cameras 210 and 215 may photograph a counterpart having a conversation with the user. The second cameras 230 and 235 may be arranged to be capable of photographing a mouth shape of the user. The second cameras 230 and 235 may be arranged at positions of the wearable display device 201 corresponding to upper left/right sides of the nose of the user when the user wears the wearable display device 201. When the user wears the wearable display device 201, a (2-1)th camera 230 may be disposed on the right corresponding to the right side of the nose, and a (2-2)th camera 235 may be disposed on the left corresponding to the left side of the nose of the user. The third cameras 250 and 255 may be arranged to be capable of photographing a gaze of the user. When the wearable display device 201 is glasses, the third cameras 250 and 255 may be arranged at a nose pad portion of the glasses. A (3-1)th camera 250 may be disposed on the left and a (3-2)th camera 255 may be disposed on the right.

According to various embodiments, the wearable display device 201 may analyze a first image obtained from the first cameras 210 and 215 to identify (or determine) whether a person (for example, a counterpart) is included in the first image, and analyze a change of a mouth shape of the counterpart to identify (or determine) whether the counterpart makes an utterance. The wearable display device 201 may analyze a change of a mouth shape of the user of a second image obtained from the second cameras 230 and 235 to identify (or determine) whether the user makes an utterance. The wearable display device 201 may analyze a third image obtained from the third cameras 250 and 255 to identify (or determine) a direction in which the user gazes (for example, a gaze technique). For example, when the counterpart includes multiple people, the wearable display device 201 may determine (or specify) the counterpart whom the user gazes at based on the third image.

The wearable display device 201 may identify (or determine) an utterance target based on the obtained image (for example, the first image to the third image), and differently apply speech recognition process according to the identified utterance target. The wearable display device 201 may control directivity of multiple microphones (for example, the first microphone 260, the second microphone 270, and the third microphone 280) according to the utterance target. The directivity of a microphone indicates an attribute of detecting an audio signal input through a microphone according to a distance and direction, and may include an attribute of representing sensitivity according to a direction with reference to the front side of a microphone.

According to various embodiments, the first microphone 260 and the second microphone 270 may be arranged to correspond to the first cameras 210 and 215. When the wearable display device 201 is glasses, the third microphone 280 may be disposed at a temple side of the glasses and disposed at one of left or right side. Although it is shown in the drawing as being disposed on the right, the disclosure is not limited by the drawing. In addition, it is shown in the drawing that the wearable display device 201 includes three microphones, but the wearable display device may include less (for example, two) or more (for example, four) microphones. The drawing is merely an example, and the disclosure is not limited by the drawing.

For example, when the utterance target is the user, the wearable display device 201 may control the first microphone 260 to the third microphone 280 to face the user. When the utterance target is the counterpart, the wearable display device 201 may control the first microphone 260 to the third microphone 280 to face the counterpart. When the utterance target is the user and the counterpart, the wearable display device 201 may control the first microphone 260 to the third microphone 280 to face the counterpart.

The wearable display device 201 may configure the first microphone 260 to the third microphone 280 to face the user when it is determined that only the user makes an utterance, obtain an audio (or audio signal) (for example, speech of the user) of the user from at least one of first microphone 260 to the third microphone 280, and obtain an image (for example, the second image) including a mouth shape of the user from the second cameras 230 and 235. The wearable display device 201 may perform deep learning by matching the audio of the user and the mouth shape of the user, and perform a function according to the utterance of the user based on the deep learning. The deep learning may be a type of machine learning technique for training a computer to perform an operation such as speech recognition, image classification, object detection. The deep learning may be a technology for allowing a computer to think and learn like a human through various data by constructing a neural network mimicking human brain neural circuits in multiple layers.

According to various embodiments, the wearable display device 201 may perform deep learning using a processor such as a neural processing unit (NPU) (for example, the auxiliary processor 123 of FIG. 1). The wearable display device 201 may match the audio of the user and the mouth shape of the user by utilizing a lip-reading technology to enhance speech recognition performance. The wearable display device 201 may be linked to an external server (for example, the server 108 in FIG. 1) to perform deep learning. The wearable display device 201 may transmit, to the server 108, audio data including the speech of the user and an image including the mouth shape of the user, and receive a deep learning result (for example, a text or translation information) from the server 108. The deep learning technology amounts to a well-known technique and thus a detailed description thereof may be omitted.

For example, the wearable display device 201 may recognize speech of the audio (or audio signal) of the user to convert the same into a first text corresponding to the speech, and analyze the mouth shape of the user to convert the same into a second text corresponding to a change of the mouth shape (for example, a movement of a lip). The wearable display device 201 may determine an utterance content of the user based on whether the first text matches the second text, and perform a function according to the utterance content. For example, the wearable display device 201 may perform a speech command according to the utterance content, or display the utterance. The wearable display device 201 may control a process to translate an utterance (for example, an utterance of the counterpart received after the utterance of the user) received next according to the speech command, and then output or display a translated text as an audio (for example, text to speech (TTS)). According to various embodiments, the wearable display device 201 may recognize the speech of the audio of the user by utilizing an audio filter specified (or personalized) for the utterance of the user.

When it is determined that only the counterpart makes an utterance, the wearable display device 201 may obtain an image (for example, the third image) from the third cameras 250 and 255 to specify a conversation counterpart, configure the first microphone 260 to the third microphone 280 to face the specified conversation counterpart, and obtain an audio (for example, speech of the counterpart) of the specified conversation counterpart from at least one of the first microphone 260 to the third microphone 280. The wearable display device 201 may obtain an image (for example, the first image) including a mouth shape of the specified conversation counterpart from the first cameras 210 and 215.

The wearable display device 201 may perform deep learning by matching the audio of the specified conversation counterpart and the mouth shape of the specified conversation counterpart, and perform a function according to the utterance of the specified conversation counterpart based on the deep learning. The wearable display device 201 may recognize speech from the audio of the specified conversation counterpart to convert the same into a first text corresponding to the speech, and analyze the mouth shape of the specified conversation counterpart to convert the same into a second text corresponding to a change of the mouth shape (for example, a movement of the mouth). The wearable display device 201 may determine an utterance content of the specified conversation counterpart based on whether the first text matches the second text, and perform a function according to the utterance of the conversation counterpart. The wearable display device 201 may convert the utterance of the conversation counterpart into a text to display, or translate the utterance of the conversation counterpart, and output or display the translated text as an audio (for example, text to speech (TTS)). According to various embodiments, the wearable display device 201 may recognize the speech of the audio of the conversation counterpart by utilizing an audio filter specified (or personalized) for the utterance of conversation counterpart.

When it is determined that the user and the counterpart concurrently make an utterance, the wearable display device 201 may obtain an image (for example, the third image) from the third cameras 250 and 255 to specify the conversation counterpart, configure the first microphone 260 to the third microphone 280 to face the specified conversation counterpart, and obtain an audio (for example, speech of the counterpart) of the specified conversation counterpart from at least one of the first microphone 260 to the third microphone 280. The wearable display device 201 may obtain an image (for example, the first image) including a mouth shape of the specified conversation counterpart from the first cameras 210 and 215 and obtain an image (for example, the second image) including a mouth shape of the user from the second cameras 230 and 235.

According to various embodiments, the wearable display device 201 may obtain speech of the user even when the first microphone 260 to the third microphone 280 are configured to face the specified conversation counterpart. When the user and the counterpart concurrently utter, the wearable display device 201 may utilize only the audio of the specified conversation counterpart among the obtained audio for speech recognition, and may not utilize the audio of the user for speech recognition.

The wearable display device 201 may perform deep learning by matching the audio of the conversation counterpart and the mouth shape of the conversation counterpart, and perform deep learning based on the mouth shape of the user. The wearable display device 201 may respectively process the utterance of the conversation counterpart and the utterance of the user based on a deep learning result. For example, the wearable display device 201 may convert an utterance content of the conversation counterpart into a text to display the same, or translate an utterance content of the conversation counterpart to output (for example, TTS) the same as an audio or display the same as a text. Alternatively, the wearable display device 201 may translate the utterance content of the user to display the same as a text or output (for example, TTS) as an audio.

According to various embodiments, the wearable display device 201 may be connected to an external electronic device (for example, the electronic device 101, a smart phone, a tablet PC, and a laptop computer) through a wire or wireless pairing. For example, the wearable display device 201 may be connected to an electronic device through a near field wireless communication such as Bluetooth, low energy Bluetooth, Wi-Fi, Wi-Fi direct, or ultra wide band (UWB). During communication connection with an external electronic device, the wearable display device 201 may transmit, to the external electronic device, gaze information (for example, field of view (FOV) or angle of view (AOV)) of the user and image information generated by photographing through a camera (not shown) of the wearable display device 201 periodically, and/or when a state change (for example, a change of position or direction) of the wearable display device 201 occurs.

Figure 3:
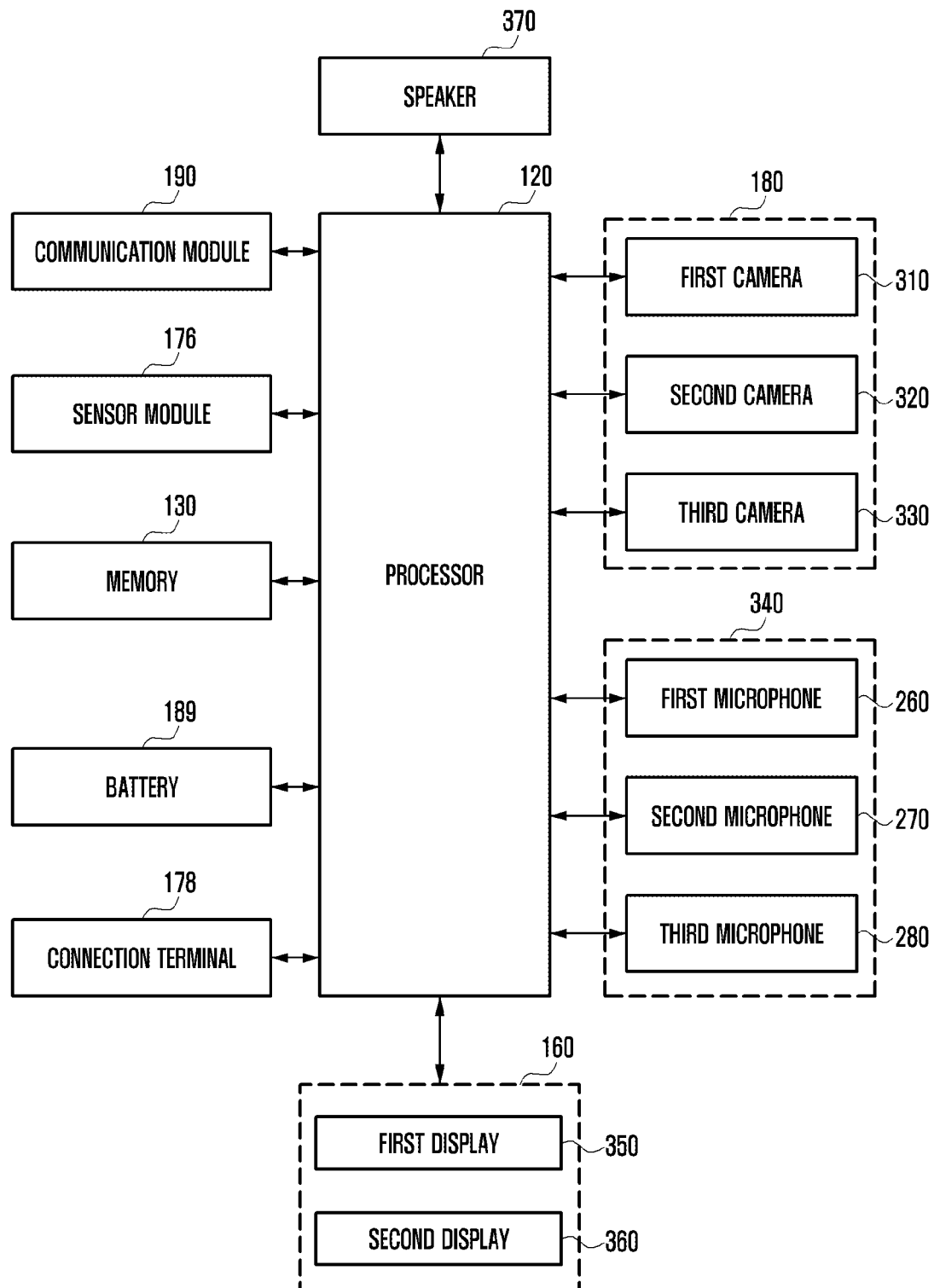
FIG. 3 is a block diagram illustrating an example configuration of an electronic device according to various embodiments.

FIG. 3 is a block diagram illustrating an example configuration of an electronic device according to various embodiments.

Referring to FIG. 3, an electronic device (for example, the electronic device 101 in FIG. 1 or the wearable display device 201 in FIG. 2) according to various embodiments may include a processor (e.g., including processing circuitry) 120 (for example, the processor 120 in FIG. 1), a communication module (e.g., including communication circuitry) 190 (for example, the communication module 190 in FIG. 1), a sensor module (e.g., including at least one sensor) 176 (for example, the sensor module 176 in FIG. 1), a memory 130 (for example, the memory 130 in FIG. 1), a battery 189 (for example, the battery 189 in FIG. 1), a connection terminal 178 (for example, the connection terminal 178 in FIG. 1), a display module (e.g., including a display) 160 (for example, the display module 160 in FIG. 1), a speaker 370 (for example, the audio output module 155 in FIG. 1), a camera module (e.g., including at least one camera) 180 (for example, the first cameras 210 and 215 to the third cameras 250 and 255 in FIG. 2), and/or multiple microphones 340 (for example, the input module 150 in FIG. 1, and the first microphone 260 to the third microphone 280 in FIG. 2).

According to an embodiment, the electronic device 101 shown in FIG. 3 may include the entirety or a portion of components of the electronic device 101 described with reference to FIG. 1. According to an embodiment, FIG. 3 may show an example that the electronic device 101 is the wearable display device 201. According to an embodiment, the wearable display device 201 may be connected to an external electronic device (not shown) through the connection terminal 178 (for example, USB type-C). For example, the wearable display device 201 may receive power from the external electronic device through the communication terminal 178 to charge the battery 189.

According to an embodiment, the components included in the wearable display device 201 may be understood as, for example, a hardware module (for example, a circuitry). The components of the wearable display device 201 shown in FIG. 3 may be omitted, replaced with other components, or include additional components added thereto. For example, the first display module 350 and the second display module 360 may be included when the electronic device 101 is the wearable display device 201, and may not be included when the electronic device 101 is a smartphone.

According to an embodiment, by executing a program (for example, a program 140 in FIG. 1) stored in the memory 130, the processor 120 may include various processing circuitry and control at least one other component (for example, a hardware or software component) and process various data or perform operations. According to an embodiment, the processor 120 may provide various contents to which expended reality (XR) such as virtual reality (VR), augmented reality (AR), and/or mixed reality (MR) is applied. The processor 120 may output at least one virtual object so that at least one virtual object is displayed in a real space corresponding to the gaze (for example, FOV and AOV) of a user who wears the wearable display device 201 through the display module 160.

According to an embodiment, the display module 160 may include at least one piece of glass. According to an embodiment, first glass may include at least a portion of the first display module 350, and second glass may include at least a portion of the second display module 360. For example, each of the first display module 350 and/or the second display module 360 may include a display panel. The display panel may be include a transparent element to allow a user to recognize a real space through the display module 160. The display module 160 may display at least one virtual object on at least a portion of the display panel to allow a user wearing the wearable display device 201 to perceive that the virtual object is attached to the real space.

According to various embodiments, the first display module 350 and/or the second display module 360 may include a condensing lens and/or a transparent waveguide. For example, the transparent waveguide may be at least partially disposed on a portion of the first display module 350 and/or the second display module 360. According to an embodiment, the first display module 350 and/or the second display module 360 may receive emitted light and the emitted light may be transferred to a user through a waveguide and/or a waveguide path configured in the first display module 350 and/or the second display module 360. The waveguide may be formed of glass or a polymer, and may include a nanopattern, for example, a grating structure having a polygonal or curved surface shape formed on a surface inside or outside. According to an embodiment, incident light may be propagated or reflected inside the waveguide to be transferred to a user.

For example, the gaze of a user may include an angle and/or range at which the user may recognize a thing (for example, object). According to various embodiments, the display module 160 may include the first display module 350 corresponding to the left eye and/or the second display module 360 corresponding to the right eye among both eyes of a user. According to an embodiment, the processor 120 may load, from the memory 130, configuration information (for example, a resolution, a frame rate, a size of a display area, and/or sharpness) related to performance of the display module 160, and control performance of the display module 160 based on the configuration information.

According to an embodiment, the sensor module 176 may include at least one of a proximity sensor, a illuminance sensor, and/or a gyro sensor, or the like. According to an embodiment, the proximity sensor may detect an object adjacent to the wearable display device 201. The illuminance sensor may measure an ambient brightness level of the wearable display device 201. According to an embodiment, the processor 120 may identify a brightness level of the wearable display device 201 using the illuminance sensor and change configuration information related to brightness of the display module 160 based on the brightness level. For example, when the ambient brightness is higher than configured brightness, the processor 120 may configure the brightness level of the display module 160 to be higher to improve visibility for a user. According to an embodiment, the gyro sensor may detect a posture and position of the wearable display device 201. For example, the gyro sensor may detect whether the wearable display device 201 is properly worn on a user's head. For example, the gyro sensor may detect a movement of a user wearing the wearable display device 201.

According to an embodiment, the wearable display device 201 may perform wireless communication with an external electronic device (for example, the electronic device 102 or 104 in FIG. 1) through the communication module 190 (for example, a wireless communication circuit). For example, the wearable display device 201 may perform wireless communication with an external electronic device (for example, a smartphone) and exchange an instruction and/or data with each other. According to an embodiment, the wearable display device 201 may be at least partially controlled by an external electronic device (for example, a portable electronic device). For example, the wearable display device 201 may perform at least one function under control of another electronic device outside.

According to various embodiments, the wearable display device 201 may transfer, through the camera module 180, information of a distance from an object in the real space, gaze information of a user, gesture information of a user to another electronic device. According to an embodiment, the camera module 180 may include at least one first camera 310, at least one second camera 320, and at least one third camera 330. The at least one first camera 310 may correspond to the first cameras 210 and 215 in FIG. 2, the at least one second camera 320 may correspond to the second cameras 230 and 235 in FIG. 2, and the at least one third camera 330 may correspond to the third cameras 250 and 255 in FIG. 2. The camera module 180 may include a gesture camera, an eye tracking camera, a distance measurement camera (a depth camera), and/or an RGB camera. For example, the first camera 310 may be a distance measurement camera or an RGB camera. The second camera 320 may be a gesture camera and the third camera 330 may be an eye tracking camera.

According to an embodiment, the gesture camera may detect a movement of a user. For example, at least one gesture camera may be disposed in the electronic device 101 and may detect a hand movement of the user within a preconfigured distance. The gesture camera may include a simultaneous localization and mapping (SLAM) camera for recognizing information (for example, a position, and/or direction) related to an ambient space of the electronic device 101. The gesture recognition area of the gesture camera may be configured based on a photographing range of the gesture camera.

According to an embodiment, the eye tracking camera may track a movement of a left eye and right eye of the user. According to an embodiment, the processor 120 may identify a gaze direction of the left eye and a gaze direction of the right eye (for example, gaze information of a user) using the eye tracking camera. For example, the eye tracking camera may include a first eye tracking camera (for example, the (3-2)th camera 255 in FIG. 2) for identifying a gaze direction of the left eye and a second eye tracking camera (for example, the (3-1) camera 250 in FIG. 2) for identifying a gaze direction of the right eye. According to an embodiment, the distance measurement camera may measure a distance to an object disposed at the front side of the wearable display device 201. The distance measurement camera may include a time of flight (TOF) camera and/or a depth camera. According to an embodiment, the distance measurement camera may photograph the front direction of the wearable display device 201 and the eye tracking camera may photograph a direction opposite to the photographing direction of the distance measurement camera.

The multiple microphones 340 may include at least one of a first microphone 260, a second microphone 270, and a third microphone 280. The processor 120 may configure (or determine) directivity of the multiple microphones 340 based on an utterance target. The directivity of a microphone indicates an attribute of detecting an audio signal input through a microphone according to a distance and direction, and may include an attribute of representing sensitivity according to a direction with reference to the front side of a microphone. At least one of the first microphone 260 to the third microphone 280 may obtain, as an audio, speech of a user or speech of a counterpart (for example, conversation counterpart) having a conversation with the user. The processor 120 may perform speech recognition based on the audio obtained through at least one of the first microphone 260 to the third microphone 280.

According to various embodiments, the first microphone 260 and the second microphone 270 may be arranged to correspond to the first cameras 310. When the wearable display device 201 is glasses, the third microphone 280 may be disposed at a temple side of the glasses and disposed at one of left or right side. In addition, it is shown in the drawing that the wearable display device 201 includes three microphones, but the wearable display device may include less (for example, two) or more (for example, four) microphones. The drawing is merely an example, and the disclosure is not limited by the drawing.

According to various embodiments, the processor 120 may obtain an image through at least one of the first camera 310 to the third camera 330, identify (or determine) an utterance subject based on the obtained image, and differently apply a speech recognition process according to identified utterance target. For example, when the utterance target is the user, the processor 120 may control the first microphone 260 to the third microphone 280 to face the user. When the utterance target is the counterpart, or the user and the counterpart concurrently utter, the processor 120 may control the first microphone 260 to the third microphone 280 to face the counterpart.

For example, when it is determined that only the user makes an utterance, the processor 120 may configure the first microphone 260 to the third microphone 280 to face the user, obtain an audio (for example, speech of the user) of the user from at least one of the first microphone 260 to the third microphone 280, and obtain an image including a mouth shape of the user from the second camera 320. The processor 120 may perform deep learning by matching the audio of the user and the mouth shape of the user, and perform a function according to the utterance of the user based on the deep learning. The processor 120, as a neural processing unit (NPU) (for example, the auxiliary processor 123 in FIG. 1), may directly perform deep learning or perform deep learning in linkage with an external server (for example, the server 108 in FIG. 1).

According to various embodiments, when it is determined that only the counterpart makes an utterance, the processor 120 may obtain an image from the third cameras 330 to specify a conversation counterpart, configure the first microphone 260 to the third microphone 280 to face the specified conversation counterpart, and obtain an audio (for example, speech of the counterpart) of the specified conversation counterpart from at least one of the first microphone 260 to the third microphone 280. The processor 120 may obtain an image (for example, the first image) including a mouth shape of the specified conversation counterpart from the first camera 310. The processor 120 may perform deep learning by matching the audio of the conversation counterpart and the mouth shape of the conversation counterpart, and perform a function according to the utterance of the specified conversation counterpart based on the deep learning.

According to various embodiments, when it is determined that the user and the counterpart concurrently utter, the processor 120 may obtain an image from the third camera 330 to specify a conversation counterpart, configure the first microphone 260 to the third microphone 280 to face the specified conversation counterpart, and obtain an audio (for example, speech of the counterpart) of the specified conversation counterpart from at least one of the first microphone 260 to the third microphone 280. The processor 120 may obtain an image (for example, the first image) including a mouth shape of the specified conversation counterpart from the first camera 310 and obtain an image (for example, the second image) including a mouth shape of the user from the second cameras 320. The processor 120 may perform deep learning by matching the audio of the conversation counterpart and the mouth shape of the conversation counterpart, and perform deep learning based on the mouth shape of the user. The processor 120 may respectively process the utterance of the conversation counterpart and the utterance of the user based on a deep learning result.

According to various embodiments, the processor 120 may obtain speech of the user even when the first microphone 260 to the third microphone 280 are configured to face the specified conversation counterpart. When the user and the counterpart concurrently utter, the processor 120 may utilize only the audio of the specified conversation counterpart among the obtained audio for speech recognition, and may not utilize the audio of the user for speech recognition.

An electronic device (for example, the electronic device 101 in FIG. 1) according to various example embodiments of the disclosure may include: multiple cameras (for example, the first cameras 210 and 215, the second cameras 230 and 235, and the third cameras 250 and 255 in FIG. 2) arranged at different positions, multiple microphones (for example, the first microphone 260, the second microphone 270, and the third microphone 280 in FIG. 2) arranged at different positions, a memory (for example, the memory 130 in FIG. 1), and a processor (for example, the processor 120 in FIG. 1) operatively connected to at least one of the multiple cameras, the multiple microphones, and the memory, wherein the processor is configured to: determine, using at least one of the multiple cameras, whether at least one of a user wearing the electronic device or a counterpart having a conversation with the user makes an utterance, configure directivity of at least one of the multiple microphones based on the determination, obtain audio from at least one of the multiple microphones based on the configured directivity, obtain an image including a mouth shape of the user or the counterpart from at least one of the multiple cameras, and process speech of an utterance target in a different manner based on the obtained audio and image.

The multiple cameras may include at least one from among at least one first camera (for example, the first cameras 210 and 215 in FIG. 2) configured to be capable of photographing a target at which the user is looking, at least one second camera (for example, the second cameras 230 and 235 in FIG. 2) configured to be capable of photographing a mouth shape of the user, or at least one third camera (for example, the third cameras 250 and 255 in FIG. 2) configured to be capable of tracking a gaze of the user.

The processor may be configured to: obtain a first image including a mouth shape of at least one conversation counterpart from the at least one first camera, obtain a second image including a mouth shape of the user from the at least one second camera, obtain a third image including a gaze direction of the user from the at least one third camera, and identify an utterance target based on the first image to the third image.

The processor may be configured to: determine a conversation counterpart to whom the gaze of the user is directed based on the third image based on the utterance target being the counterpart, or the user and the counterpart.

The processor may be configured to: configure the multiple microphones to face the user based on the utterance target being the user, and configure the multiple microphones to face the counterpart based on the utterance target being the counterpart, or the user and the counterpart.

The processor may be configured to: perform deep learning by matching the audio of the user and the mouth shape of the user, and perform a function according to the utterance of the user based on the deep learning based on the utterance target being the user.

The processor may be configured to perform a voice command according to a content of the utterance of the user, or display the utterance through a display of the electronic device.

The processor may be configured to: perform deep learning by matching the audio of the counterpart and the mouth shape of the counterpart, and perform a function according to the utterance of the counterpart based on the deep learning based on the utterance target being the counterpart.

The processor may be configured to: convert the utterance of the conversation counterpart into a text to be displayed through the display of the electronic device, or translate the utterance of the conversation counterpart and output the translated text as an audio or display the translated text through the display.

The processor may be configured to: perform deep learning by matching the audio of the counterpart and the mouth shape of the counterpart, perform deep learning with respect to the mouth shape of the user, and perform respective functions according to the utterance of the counterpart and the utterance of the user based on the deep learning, based on the utterance target being the user and the counterpart.

Based on the user and the counterpart concurrently uttering, the processor may be configured to utilize only the audio of the counterpart among the obtained audio for speech recognition, and to not utilize the audio of the user for speech recognition.

The electronic device may be a wearable display device (for example, the wearable display device 201 in FIG. 2) having a form of glasses wearable on the user.

Figure 4:
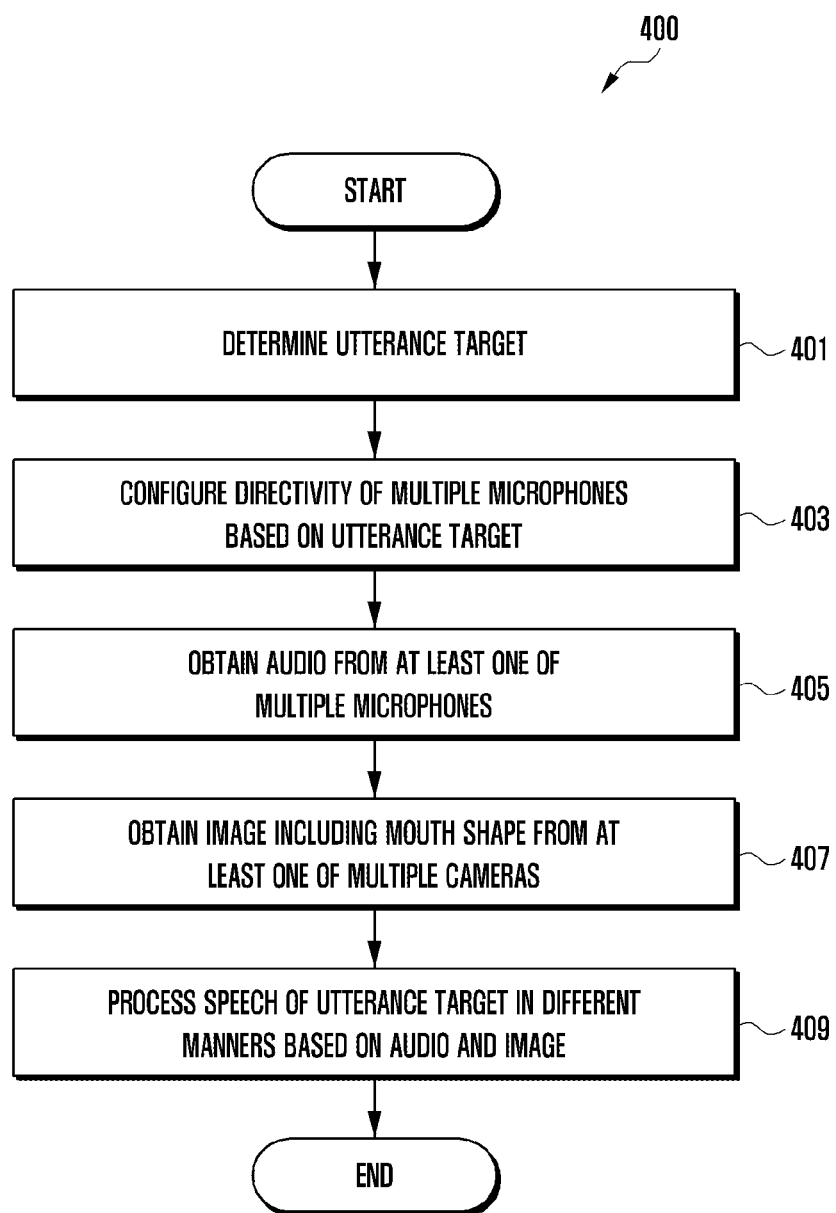
FIG. 4 is a flowchart illustrating an example method of operating an electronic device according to various embodiments.

FIG. 4 is a flowchart 400 illustrating an example method of operating an electronic device according to various embodiments.

Referring to FIG. 4, in operation 401, the processor (for example, the processor 120 in FIG. 1) of the electronic device (for example, the electronic device 101 of FIG. 1, and the wearable display device 201 in FIG. 2) according to various embodiments may determine an utterance target. The electronic device 101 may be the wearable display device 201 having a shape (for example, glasses) that may be worn on the user's face. The wearable display device 201 may include multiple cameras (for example, the camera module 180 in FIG. 1, the first cameras 210 and 215 to the third cameras 250 and 255 in FIG. 2, and the first camera 310 to the third camera 330 in FIG. 3). The processor 120 may identify (or determine) an utterance target using the multiple cameras. The utterance target may be at least one of a user wearing the wearable display device 201, a counterpart having a conversation with the user, or the user and the counterpart (for example, the user and the counterpart concurrently utter). The counterpart may be one or more.

For example, the processor 120 may obtain an image from at least one from among the first cameras 210 and 215 arranged to be capable of photographing the target (for example, the front side of the user) that the user is looking at, the second cameras 230 and 235 arranged to be capable of photographing a mouth shape of the user, and the third cameras 250 and 255 arranged to track (or photograph) the gaze of the user. The arrangement position of each camera has been described in detail through FIG. 2, and thus a detailed description thereof will be omitted. The processor 120 may obtain a first image from the first cameras 210 and 215, obtain a second image from the second cameras 230 and 235, and obtain a third image from the third cameras 250 and 255. The processor 120 may analyze the first image to the third image to determine an utterance target. When the first image includes a person (for example, the counterpart) and the mouth shape of the counterpart moves, the processor 120 may identify (or determine) that the counterpart makes an utterance. The processor 120 may analyze the mouth shape of the user included in the second image, and when the mouth shape of the user moves, identify that the user makes an utterance.

In operation 403, the processor 120 may configure directivity of multiple microphones (for example, the first microphone 260, the second microphone 270, and the third microphone 280 in FIG. 2) according to the utterance target. The processor 120 may control (or configure) the multiple microphones to face the user when the utterance target is the user. The processor 120 may control (or configure) the multiple microphones to face the counterpart when the utterance target is the counterpart. The processor 120 may analyze a third image to identify (or determine) a direction in which the user gazes (for example, a gaze technology) when the utterance target is the user and the counterpart. For example, when the counterpart includes multiple people, the processor 120 may determine (or specify) the counterpart to whom the user's gaze is directed based on the third image. The processor 120 may control (or configure) the multiple microphones to face the counterpart to whom the user's gaze is directed.

In operation 405, the processor 120 may obtain an audio from at least one of the multiple microphones. The multiple microphones are arranged at different positions and thus there may be a difference in the time to obtain the audio. The directivity of a microphone indicates an attribute of detecting an audio signal input through a microphone according to a distance and direction, and may include an attribute of representing sensitivity according to a direction with reference to the front side of a microphone. For example, when the user makes an utterance, the audio obtained from the second microphone 270 and the first microphone 260 facing the front side of the user and the audio obtained from the third microphone 280 facing the lateral side of the user may have time difference therebetween. The processor 120 may apply a microphone directivity technology to the obtained audio so as to selectively analyze the audio of the target who makes a simultaneous utterance.

According to various embodiments, the processor 120 may analyze only the audio of the user (for example, speech of the user) when the utterance target is the user, and analyze the audio of the counterpart (for example, speech of the counterpart) when the utterance target is the counterpart based on the distance and direction of the audio obtained from the multiple microphones. The processor 120 may analyze only the audio of the counterpart (for example, speech of the counterpart) when the utterance target is the user and the counterpart. The multiple microphones may obtain an audio (or audio signal) and transfer the obtained audio to the processor 120. The processor 120 may select a required audio and analyze the same based on a distance and direction of the received audio.

In operation 407, the processor 120 may obtain an image including a mouth shape from at least one of the multiple cameras. The processor 120 may obtain a first image from the first cameras 210 and 215, obtain a second image from the second cameras 230 and 235, and obtain a third image from the third cameras 250 and 255 in real time. The processor 120 may obtain the second image including a mouth shape of the user in real time when the utterance target is the user, and obtain the first image including a mouth shape of the counterpart in real time when the utterance target is the counterpart. When the counterpart is multiple people, the processor 120 may obtain the third image in real time and analyze the third image (for example, a gaze processing technology) so as to specify (or determine or identify) a conversation counterpart who makes an utterance. The processor 120 may obtain the first image including a mouth shape of the counterpart and the second image including a mouth shape of the user in real time when the utterance target is the user and the counterpart.

In operation 409, the processor 120 may process the speech of the utterance target in different manners, based on the audio and the image. When the utterance target is the user, the processor 120 may perform deep learning by matching the audio of the user and the mouth shape of the user, and perform a function according to the utterance of the user based on the deep learning. The processor 120 may recognize speech of the audio (or audio signal) of the user to convert the same into a first text corresponding to the speech, and analyze the mouth shape of the user to convert the same into a second text corresponding to a change of the mouth shape (for example, movement of a mouth).

The processor 120 may determine an utterance content of the user based on whether the first text matches the second text, and perform a function according to the utterance content. The processor 120 may match the audio of the user and the mouth shape of the user by utilizing a lip-reading technology to enhance speech recognition performance. For example, the processor 120 may perform an audio command according to the utterance content, or display the utterance content. Alternatively, the processor 120 may translate an utterance (for example, an utterance of the counterpart) received next and output the translated text as an audio or display the translated text.

According to various embodiments, the processor 120 may recognize the speech of the audio of the user by utilizing an audio filter specified (or personalized) for the utterance of the user. Even when the same word is uttered, utterance characteristics may be different for each user. The processor 120 may collect (for example, big data) utterances of the user for a predetermined (e.g., specified) period of time (for example, one day, seven days, thirty days, and the like) and analyze (or learn) the collected utterances of the user so as to generate a user-specific audio filter suitable for the user. The processor 120 may store the generated user-specific audio filter in the memory (for example, the memory 130 in FIG. 1). The processor 120 may keep updating the user-specific audio filter stored in the memory 130 whenever the utterance of the user is collected.

According to various embodiments, when the utterance target is the counterpart, the processor 120 may perform deep learning by matching the audio of the specified conversation counterpart and the mouth shape of the specified conversation counterpart, and perform a function according to the utterance of the specified conversation counterpart based on the deep learning. The processor 120 may recognize speech from the audio of the specified conversation counterpart to convert the same into a first text corresponding to the speech, and analyze the mouth shape of the specified conversation counterpart to convert the same into a second text corresponding to a change of the mouth shape (for example, movement of the mouth). The processor 120 may determine an utterance content of the specified conversation counterpart based on whether the first text matches the second text, and perform a function according to the utterance content.

According to various embodiments, the processor 120 may recognize the speech of the audio of the conversation counterpart by utilizing an audio filter specified (or personalized) for the utterance of the conversation counterpart. The processor 120 may collect utterances of the conversation counterpart for a predetermined period of time (for example, one day, seven days, thirty days, and the like) and analyze (or learn) the collected utterances of the conversation counterpart so as to generate a conversation counterpart-specific audio filter suitable for the conversation counterpart. The conversation counterpart may be multiple people, and the processor 120 may generate a conversation counterpart-specific audio filter only for the conversation counterpart (for example, a family member, or close friend) designated by the user. The processor 120 may store the generated conversation counterpart-specific audio filter in the memory (for example, the memory 130 in FIG. 1). The processor 120 may keep updating the conversation counterpart-specific audio filter stored in the memory 130 whenever the utterance of the conversation counterpart is collected.

According to various embodiments, the processor 120 may perform deep learning by matching the audio of the conversation counterpart and the mouth shape of the conversation counterpart, and perform deep learning based on the mouth shape of the user when the user and the conversation counterpart concurrently utter. The processor 120 may respectively process the utterance of the conversation counterpart and the utterance of the user based on a deep learning result. For example, the processor 120 may display the utterance of the conversation counterpart as a text, or translate the utterance of the conversation counterpart to output the same as an audio or display as a text. Alternatively, the processor 120 may translate the utterance of the user to display the same as a text or output (for example, TTS) as an audio.

According to various embodiments, the processor 120 may obtain speech of the user even when the first microphone 260 to the third microphone 280 are configured to face the specified conversation counterpart when the user and the counterpart concurrently utter. When the user and the counterpart concurrently utter, the processor 120 may utilize only the audio of the specified conversation counterpart among the obtained audio for speech recognition, and may not utilize the audio of the user for speech recognition.

Figure 5:
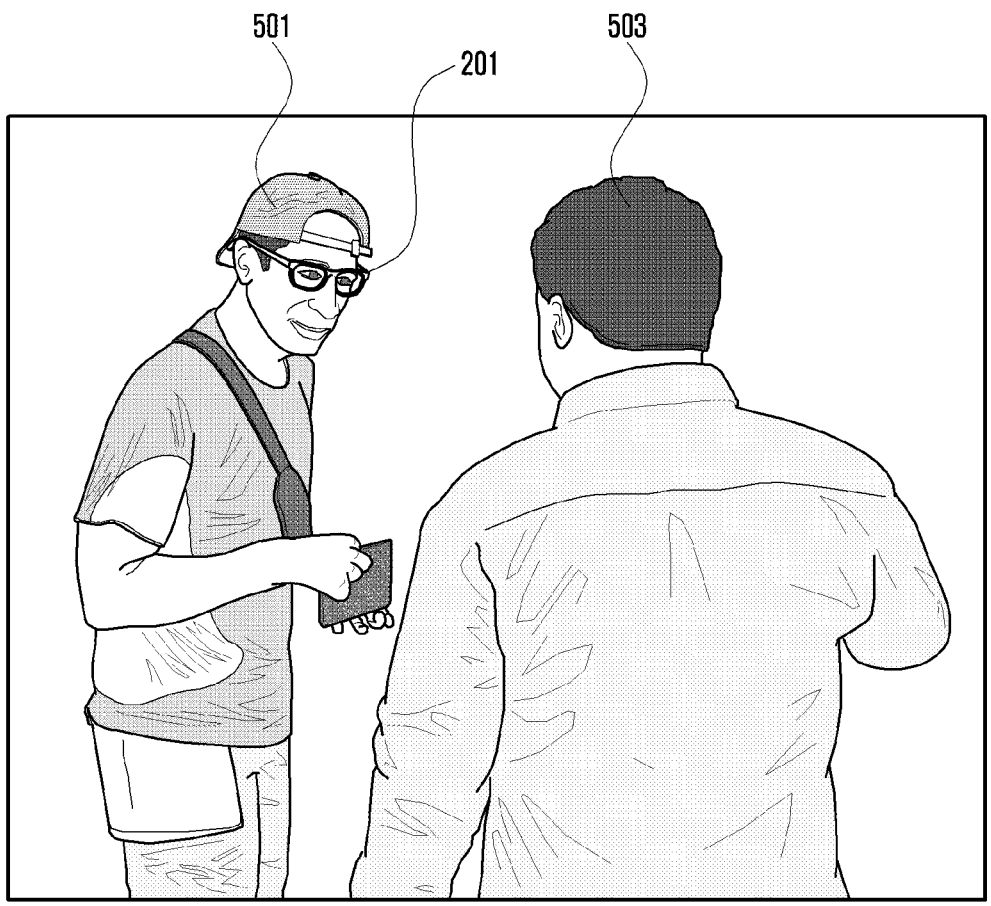
FIG. 5 is a diagram illustrating an example in which a user wearing an electronic device has a conversation with a counterpart according to various embodiments.

FIG. 5 is a diagram illustrating an example in which a user wearing an electronic device has a conversation with a counterpart according to various embodiments.

Referring to FIG. 5, an electronic device (for example, the electronic device 101 of FIG. 1 or the wearable display device 201 in FIG. 2) according to various embodiments may be in a shape of glasses that may be worn on a face of a user 501. The user 501 may have a conversation with a counterpart 503 in a state of wearing the wearable display device 201. When the user 501 and the counterpart 503 have a conversation, speech recognition rate in the prior art may be low because the speech of the user 501 and the speech of the counterpart 503 are processed as one speech signal. In the disclosure, when the user 501 and the counterpart 503 have a conversation, speech recognition rate may be improved because the utterance (or voice) of the user 501 and the utterance of the counterpart 503 are separated and processed with different processes.

Figure 6:
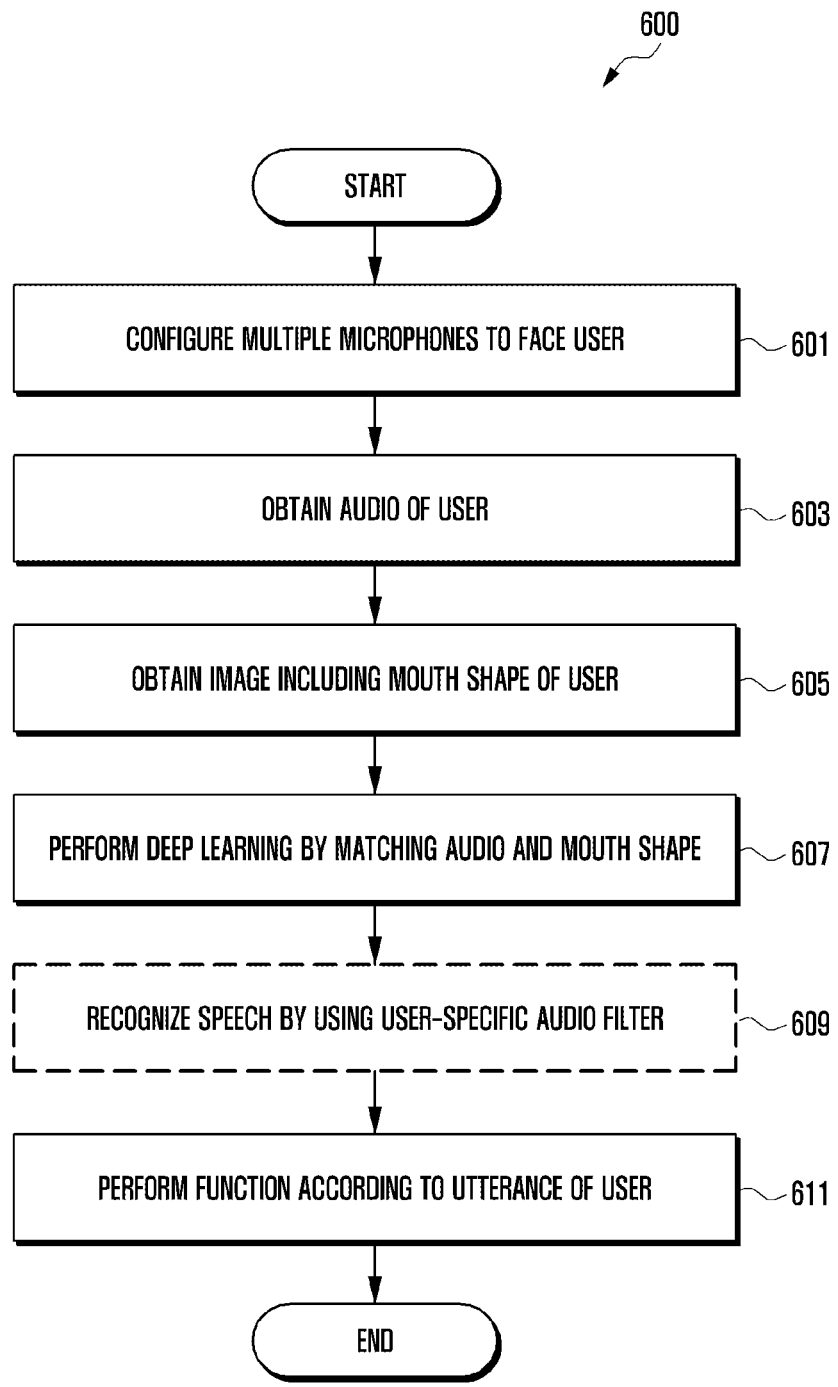
FIG. 6 is a flowchart illustrating an example method of processing speech according to an utterance of a user in an electronic device according to various embodiments.

FIG. 6 is a flowchart 600 illustrating an example method of processing a voice according to an utterance of a user in an electronic device according to various embodiments. FIG. 6 may be an operation performed when the utterance target is the "user" in operation 401 in FIG. 4.

Referring to FIG. 6, in operation 601, the processor (for example, the processor 120 in FIG. 1) of the electronic device (for example, the electronic device 101 of FIG. 1, and the wearable display device 201 in FIG. 2) according to various embodiments may configure multiple microphones (for example, the first microphone 260, the second microphone 270, and the third microphone 280 in FIG. 2) to face the user. The processor 120 may control (or configure) the multiple microphones to face the user when the utterance target is the user. The multiple microphones are arranged at different positions. While a user makes an utterance, the processor 120 may obtain ambient noise or even a voice of other people who do not have a conversation with the user at a distance through the multiple microphones. The processor 120 may configure the directivity of the multiple microphones to the user so that the utterance target may be concentrated on the user's utterance and analyzed.

In operation 603, the processor 120 may obtain an audio (or audio signal) of the user (or speech of the user). The processor 120 may select the speech of the user based on the audio obtained from the third microphone 280 disposed adjacent to the mouth of the user and the audio obtained from the first microphone 260 and the second microphone 270 facing the front side of the user. For example, when the user makes an utterance, the audio obtained from the second microphone 270 and the first microphone 260 and the audio obtained from the third microphone 280 may have time difference therebetween. The processor 120 may apply a microphone directivity technology to the obtained audio so as to selectively analyze only the audio of the user who makes a simultaneous utterance. For example, the processor 120 may perform noise processing of the ambient noise in the obtained audio and remove voices of other people other than the user. The processor 120 may ignore utterances other than the user's utterance.

In operation 605, the processor 120 may obtain an image including a mouth shape of the user. The processor 120 may analyze the mouth shape of the user as well as the speech of the user to precisely specify the utterance of the user. The processor 120 may obtain a first image from the first cameras 210 and 215, obtain a second image from the second cameras 230 and 235, and obtain a third image from the third cameras 250 and 255 in real time. The processor 120 may obtain the second image including a mouth shape of the user from the second cameras 230 and 235 in real time.

In operation 607, the processor 120 may perform deep learning by matching the audio and the mouth shape. The processor 120 may match the speech of the user and the mouth shape of the user. The processor 120 may recognize speech of the audio (or audio signal) of the user to convert the same into a first text corresponding to the speech, and analyze a change of the mouth shape of the user to convert the same into a second text corresponding to a change of the mouth shape (for example, movement of a mouth). The processor 120 may determine an accurate utterance content of the user through the comparison of the first text and the second text. The deep learning is a type of machine learning technology and may indicate learning data obtained for a predetermined period of time to output a result. The processor 120 may learn the speech of the user and the mouth shape of the user for the same text by matching the result of converting user's speech collected for a predetermined period of time into a text and the result of converting user's mouth shape collected for a predetermined period of time into a text.

In operation 609, the processor 120 may recognize speech using a user-specific audio filter. Even when the same word is uttered, utterance characteristics may be different for each user. The processor 120 may collect (for example, big data) utterances of the user for a predetermined period of time (for example, one day, seven days, thirty days, and the like) and analyze (or learn) the collected utterances of the user so as to generate a user-specific audio filter suitable for the user. The processor 120 may store the generated user-specific audio filter in the memory (for example, the memory 130 in FIG. 1). The processor 120 may keep updating the user-specific audio filter stored in the memory 130 whenever the utterance of the user is collected. Alternatively, the processor 120 may match the audio of the user and the mouth shape of the user by utilizing a lip-reading technology to enhance speech recognition performance. The processor 120 may perform operation 609 when there is the user-specific audio filter and may not perform operation 609 when there is no user-specific audio filter. Operation 609 may be omitted. Although, it is shown that operation 609 is performed after operation 607 in the drawing, operation 609 may be performed after operation 603, before operation 605, or before operation 607. The disclosure may not be limited to the description of the drawing.

In operation 611, the processor 120 may perform a function according to the utterance of the user. The processor 120 may perform a speech command according to the utterance of the user, or may display the utterance of the user through a display (for example, the display module 160 in FIG. 1, and the first display 350 and the second display 360 in FIG. 3). The processor 120 may translate an utterance (for example, an utterance of the counterpart received after the utterance of the user) received next according to the speech command. The processor 120 may perform an audio process (for example, TTS) of the translated text to output the same through a speaker (for example, the audio output module 155 in FIG. 1 and the speaker 370 in FIG. 3), or display the translated text through the display module 160.

Figure 7:
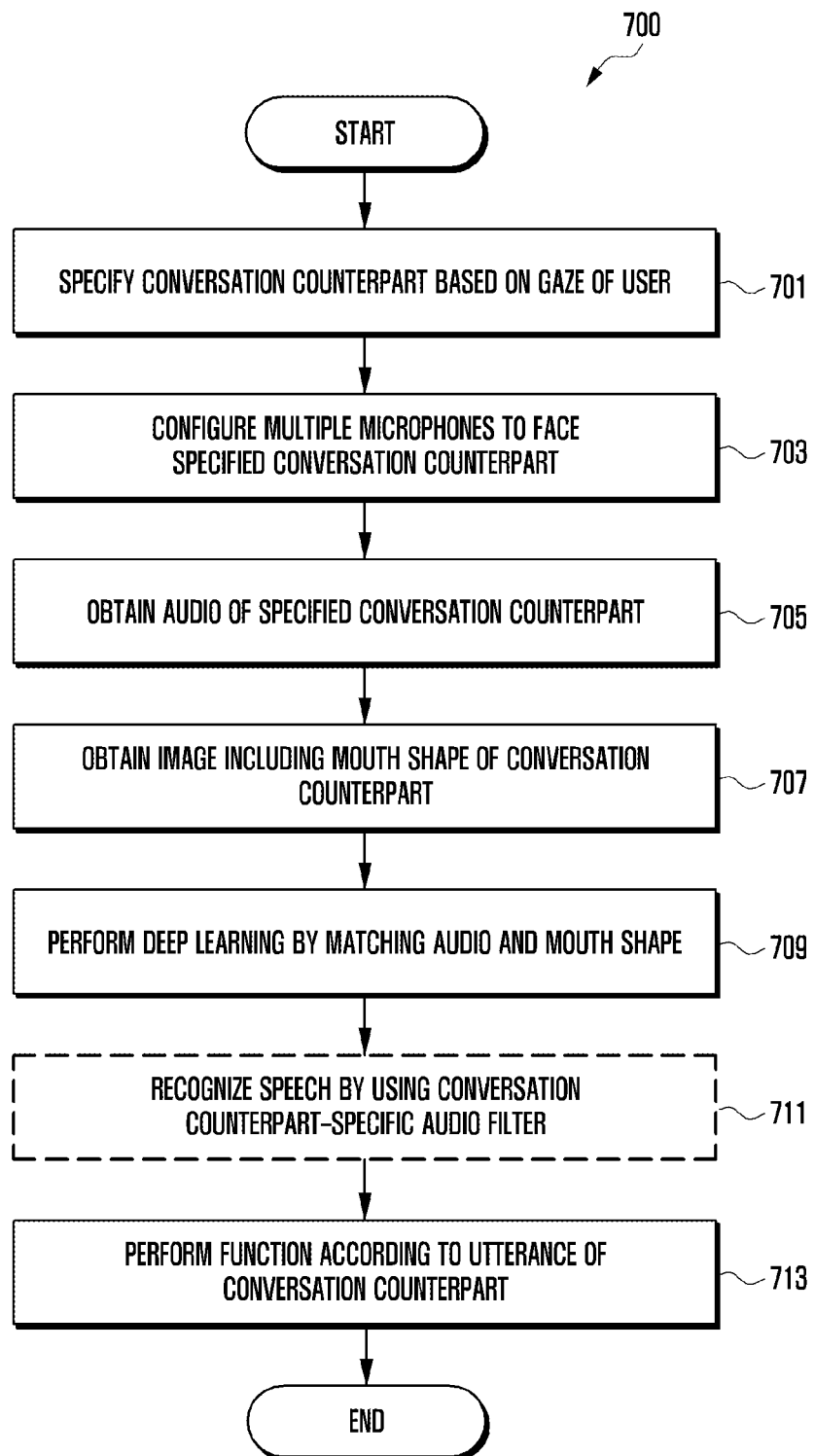
FIG. 7 is a flowchart illustrating an example method of processing speech according to an utterance of a counterpart in an electronic device according to various embodiments.

FIG. 7 is a flowchart 700 illustrating an example method of processing a voice according to an utterance of a counterpart in an electronic device according to various embodiments. FIG. 7 may be an operation performed when the utterance target is the "counterpart" in operation 401 in FIG. 4.

Referring to FIG. 7, in operation 701, the processor (for example, the processor 120 in FIG. 1) of the electronic device (for example, the electronic device 101 of FIG. 1, and the wearable display device 201 in FIG. 2) according to various embodiments may specify a conversation counterpart based on the gaze of the user. The processor 120 may obtain a first image from the first cameras 210 and 215, obtain a second image from the second cameras 230 and 235, and obtain a third image from the third cameras 250 and 255 in real time. The processor 120 may specify a conversation counterpart disposed in a gaze direction of the user based on the third image. As the conversation counterpart may be multiple people, the processor 120 may specify a counterpart currently having a conversation based on the gaze direction of the user.

In operation 703, the processor 120 may configure multiple microphones (for example, the first microphone 260, the second microphone 270, and the third microphone 280 in FIG. 2) to face the specified conversation counterpart. The processor 120 may control (or configure) the multiple microphones to face the specified conversation counterpart when the utterance target is the counterpart (for example, a person having a conversation with the user). The multiple microphones are arranged at different positions. while a counterpart makes an utterance, the processor 120 may obtain ambient noise or even a voice of other people who do not have a conversation with the user through the multiple microphones. The processor 120 may configure the directivity of the multiple microphones to the specified conversation counterpart so that the utterance target may be concentrated on the utterance of the specified conversation counterpart that the user is currently looking at and analyzed.

In operation 705, the processor 120 may obtain an audio (or audio signal) of the specified conversation counterpart (or speech of the user). The processor 120 may select the speech requiring speech recognition based on the audio obtained from the third microphone 280 disposed adjacent to the mouth of the user and the audio obtained from the first microphone 260 and the second microphone 270 facing the front side of the user. For example, when the specified conversation counterpart makes an utterance, the audio obtained from the second microphone 270 and the first microphone 260 and the audio obtained from the third microphone 280 may have time difference therebetween. The processor 120 may apply a microphone directivity technology to the obtained audio so as to selectively analyze only the audio of the specified conversation counterpart who makes a simultaneous utterance. For example, the processor 120 may perform noise processing of the ambient noise in the obtained audio and remove voices of other people other than the specified conversation counterpart. The processor 120 may ignore utterances other than the specified conversation counterpart's utterance.

In operation 707, the processor 120 may obtain an image including a mouth shape of the conversation counterpart. The processor 120 may analyze the mouth shape of the conversation counterpart as well as the speech of the conversation counterpart to precisely specify the conversation counterpart's utterance. The processor 120 may obtain a first image including a mouth shape of the conversation counterpart from the first cameras 210 and 215 in real time.

In operation 709, the processor 120 may perform deep learning by matching the audio and the mouth shape. The processor 120 may match the speech of the conversation counterpart and the mouth shape of the conversation counterpart. The processor 120 may recognize speech of the audio (or audio signal) of the conversation counterpart to convert the same into a first text corresponding to the speech, and analyze a change of the mouth shape of the conversation counterpart to convert the same into a second text corresponding to the change of the mouth shape (for example, movement of a mouth). The processor 120 may determine an accurate utterance of the conversation counterpart through the comparison of the first text and the second text. The processor 120 may perform deep learning of matching the speech of the conversation counterpart and the mouth shape of the conversation counterpart in linkage with the server 108. The processor 120 may specify an accurate utterance of the conversation counterpart based on the first text and the second text through the deep learning.

In operation 711, the processor 120 may recognize speech using a conversation counterpart-specific audio filter. Even when the same word is uttered, utterance characteristics may be different for each user. In addition, as the conversation counterpart may be multiple people, the processor 120 may specify the conversation counterpart using attributes of speech. The processor 120 may collect utterances of the conversation counterpart for a predetermined period of time (for example, one day, seven days, thirty days, and the like) (for example, big data) and analyze (or learn) the collected utterances of the conversation counterpart so as to generate a conversation counterpart-specific audio filter suitable for the conversation counterpart. The conversation counterpart may be multiple people, and the processor 120 may generate a conversation counterpart-specific audio filter only for the conversation counterpart (for example, a family member, or close friend) designated by the user. The processor 120 may store the generated conversation counterpart-specific audio filter in the memory (for example, the memory 130 in FIG. 1). The processor 120 may keep updating the conversation counterpart-specific audio filter stored in the memory 130 whenever the utterance of the conversation counterpart is collected. The processor 120 may match the audio of the conversation counterpart and the mouth shape of the conversation counterpart by utilizing a lip-reading technology to enhance speech recognition performance.

According to various embodiments, the processor 120 may perform operation 711 when there is the conversation counterpart-specific audio filter and may not perform operation 711 when there is no conversation counterpart-specific audio filter. Operation 711 may be omitted. Although it is shown that operation 711 is performed after operation 709 in the drawing, operation 711 may be performed after operation 705, before operation 707, or before operation 709. The disclosure may not be limited to the description of the drawing.

In operation 713, the processor 120 may perform a function according to the utterance of the conversation counterpart. The processor 120 may display the utterance of the conversation counterpart through a display (for example, the display module 160 in FIG. 1, and the first display 350 and the second display 360 in FIG. 3). The processor 120 may translate the utterance of the conversation counterpart. The processor 120 may perform an audio process (for example, TTS) of the translated text to output the same through a speaker (for example, the audio output module 155 in FIG. 1 and the speaker 370 in FIG. 3), or display the translated text through the display module 160.

According to various embodiments, as the conversation counterpart may be multiple people, when the conversation counterpart is changed, the processor 120 may perform the flowchart 700 in FIG. 7 with respect to the changed conversation counterpart.

Figure 8:
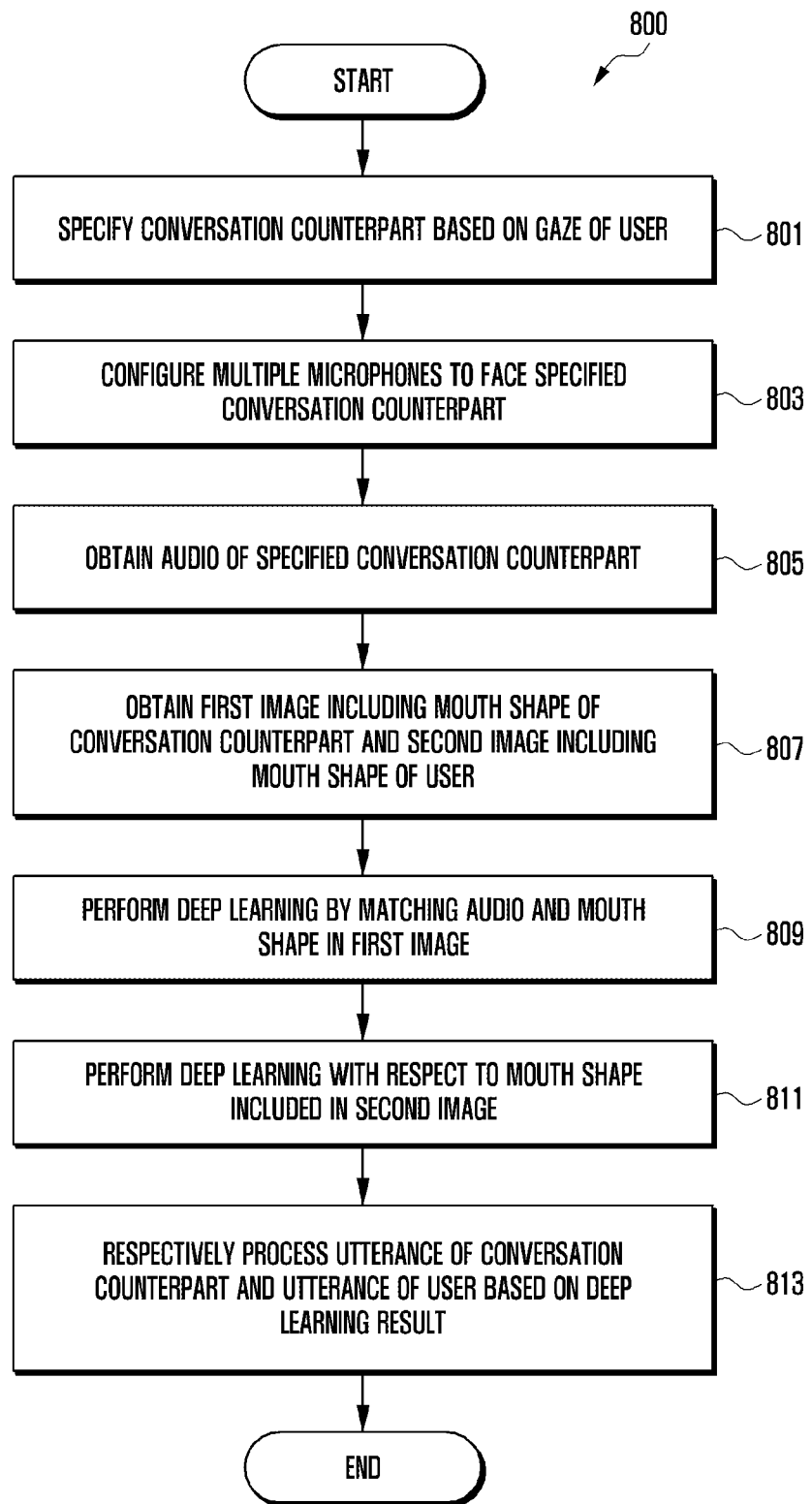
FIG. 8 is a flowchart illustrating an example method of processing speech by distinguishing an utterance target in an electronic device according to various embodiments.

FIG. 8 is a flowchart 800 illustrating an example method of processing a voice by distinguishing an utterance target in an electronic device according to various embodiments. FIG. 8 may be an operation performed when the utterance target is the "user and counterpart" in operation 401 in FIG. 4.

Referring to FIG. 8, in operation 801, the processor (for example, the processor 120 in FIG. 1) of the electronic device (for example, the electronic device 101 of FIG. 1, and the wearable display device 201 in FIG. 2) according to various embodiments may specify a conversation counterpart based on the gaze of the user. The processor 120 may obtain a first image from the first cameras 210 and 215, obtain a second image from the second cameras 230 and 235, and obtain a third image from the third cameras 250 and 255 in real time. The processor 120 may specify a conversation counterpart disposed in a gaze direction of the user based on the third image. Operation 801 is identical or similar to operation 701 in FIG. 7, and thus an overlapping description thereof will be omitted.

In operation 803, the processor 120 may configure multiple microphones (for example, the first microphone 260, the second microphone 270, and the third microphone 280 in FIG. 2) to face the specified conversation counterpart. The processor 120 may control (or configure) the multiple microphones to face the specified conversation counterpart when the utterance target is the counterpart (for example, a person having a conversation with the user). The multiple microphones are arranged at different positions. The processor 120 may configure the directivity of the multiple microphones to the specified conversation counterpart so that the utterance target may be concentrated on the utterance of the specified conversation counterpart that the user currently looking at and analyzed. Operation 803 is identical or similar to operation 703 in FIG. 7, and thus an overlapping description thereof will be omitted.

In operation 805, the processor 120 may obtain an audio (or audio signal) of the specified conversation counterpart (or speech of the user). When the specified conversation counterpart makes an utterance, the audio obtained from the second microphone 270 and the first microphone 260 and the audio obtained from the third microphone 280 may have time difference therebetween. The processor 120 may apply a microphone directivity technology to the obtained audio so as to selectively analyze only the audio of the specified conversation counterpart who makes a simultaneous utterance. For example, the processor 120 may obtain speech of the user even when the first microphone 260 to the third microphone 280 are configured to face the specified conversation counterpart when the user and the counterpart concurrently utter. When the user and the counterpart concurrently utter, the processor 120 may remove the audio of the user from the obtained audio.

In operation 807, the processor 120 may obtain a first image including a mouth shape of the conversation counterpart and a second image including a mouth shape of the user. When the user and the counterpart concurrently utter, the processor 120 may obtain both a first image including a mouth shape of the conversation counterpart and a second image including a mouth shape of the user. The wearable display device 201 may include one or more cameras, and each camera may be disposed at different positions. The first cameras 210 and 215 may be disposed to face the front of the user and photograph a mouth shape of the conversation counterpart. The second cameras 230 and 235 may be disposed to face the user and photograph a mouth shape of the user.

Although it is shown that operation 807 is performed after operation 805 in the drawing, operation 805 operation 807 may be concurrently performed. Alternatively, operation 807 may be performed first and then operation 805 may be performed. Alternatively, the processor 120 may obtain the first image including the mouth shape of the conversation counterpart while obtaining the audio of the specified conversation counterpart.

In operation 809, the processor 120 may perform deep learning by matching the audio and the mouth shape (for example, the mouth shape of the conversation counterpart) in the first image. The processor 120 may recognize speech of the audio (or audio signal) of the conversation counterpart to convert the same into a first text corresponding to the speech, and analyze a change of the mouth shape of the conversation counterpart to convert the same into a second text corresponding to the change of the mouth shape (for example, movement of a mouth). The processor 120 may determine an accurate utterance content of the conversation counterpart through the comparison of the first text and the second text. The processor 120 may perform deep learning of matching the speech of the conversation counterpart and the mouth shape of the conversation counterpart in linkage with the server 108. The processor 120 may specify an accurate utterance of the conversation counterpart based on the first text and the second text through the deep learning. Operation 809 is identical or similar to operation 709 in FIG. 7, and thus an overlapping description thereof will be omitted.

In operation 811, the processor 120 may perform deep learning with respect to the mouth shape (for example, the mouth shape of the user) included in the second image. The processor 120 may obtain speech of the user even when the first microphone 260 to the third microphone 280 are configured to face the specified conversation counterpart when the user and the counterpart concurrently utter. When the user and the counterpart concurrently utter, the processor 120 may utilize only the audio of the specified conversation counterpart among the obtained audio for speech recognition, and may not utilize the audio of the user for speech recognition. The processor 120 may analyze a change of the mouth shape of the user to specify the utterance content of the user.

In operation 813, the processor 120 may respectively process the utterance of the conversation counterpart and the utterance of the user based on a deep learning result. For example, the processor 120 may convert the utterance of the conversation counterpart into a text and display the converted text through a display (for example, the display module 160 in FIG. 1, and the first display 350 and the second display 360 in FIG. 3). The processor 120 may translate the utterance of the conversation counterpart to output the same as an audio (for example, TTS) through the speaker (for example, the audio output module 155 and the speaker 370 in FIG. 1) or display as a text. Alternatively, the processor 120 may translate the utterance of the user to display the same as a text or output (for example, TTS) as an audio.

A method of operating an electronic device (for example, the electronic device 101 in FIG. 1) according to the various example embodiments of the disclosure may include: determining whether at least one of a user wearing the electronic device or a counterpart having a conversation with the user makes an utterance using at least one of the multiple cameras (for example, the first cameras 210 and 215, the second cameras 230 and 235, and the third cameras 250 and 255 in FIG. 2) arranged at different positions, configuring directivity of at least one of multiple microphones (for example, the first microphone 260, the second microphone 270, and the third microphone 280 in FIG. 2) arranged at different positions based on the determination, obtaining an audio from at least one of the multiple microphones based on the configured directivity, obtaining an image including a mouth shape of the user or the counterpart from at least one of the multiple cameras, and processing speech of an utterance target in a different manner based on the obtained audio and image.

The multiple cameras may include at least one from among at least one first camera (for example, the first cameras 210 and 215 in FIG. 2) configured to be capable of photographing a target at which the user is looking, at least one second camera (for example, the second cameras 230 and 235 in FIG. 2) configured to be capable of photographing a mouth shape of the user, or at least one third camera (for example, the third cameras 250 and 255 in FIG. 2) configured to be capable of tracking a gaze of the user wherein the determining may include obtaining a first image including a mouth shape of at least one conversation counterpart from the at least one first camera, obtaining a second image including a mouth shape of the user from the at least one second camera, The method may further include obtaining a third image including a gaze direction of the user from the at least one third camera, and identifying an utterance target based on the first image to the third image.

The method may further include determining a conversation counterpart to whom the gaze of the user is directed based on the third image based on the utterance target being the counterpart, or the user and the counterpart.

The operation of configuring may include configuring the multiple microphones to face the user based on the utterance target being the user, or configuring the multiple microphones to face the counterpart based on the utterance target being the counterpart, or the user and the counterpart.

The operation of processing may include, based on the utterance target being the user, performing deep learning by matching the audio of the counterpart and the mouth shape of the counterpart, and performing a voice command according to a content of the utterance of the user, or displaying the utterance through a display of the electronic device based on the deep learning.

The operation of processing may include performing deep learning by matching the audio of the counterpart and the mouth shape of the counterpart, and performing a function according to the utterance of the counterpart based on the deep learning when the utterance target is the counterpart.

The operation of processing the function may include converting the utterance of the counterpart into a text to be displayed through the display of the electronic device, or translating the utterance of the conversation counterpart and output the translated text as an audio or display the translated text through the display.

The operation of processing may include performing deep learning by matching the audio of the counterpart and the mouth shape of the counterpart, performing deep learning with respect to the mouth shape of the user, and performing respective functions according to the utterance of the counterpart and the utterance of the user based on the deep learning, based on the utterance target being the user and the counterpart.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) disclosed herein may be used in conjunction with any other embodiment(s) disclosed herein.

What is claimed is:

1. An head mounted electronic device-comprising:
   multiple cameras arranged at different positions, wherein the multiple cameras comprise:
   at least one first camera obtaining an image of object in a direction toward which a user's face is oriented, when the user wears the head mounted electronic device,
   at least one second camera obtaining an image including at least a portion of the user's mouth, when the user wears the head mounted electronic device, and
   at least one third camera tracking a gaze of the user, when the user wears the head mounted electronic device,
   multiple microphones arranged at different positions;
   a memory storing instructions; and
   at least one processor operatively connected to at least one of the multiple cameras, the multiple microphones, and the memory,
   wherein the instructions, when executed by the at least one processor, individually and/or collectively, cause the head mounted electronic device to:
   determine, using the multiple cameras, which one is a speaker between the user wearing the head mounted electronic device and a counterpart having a conversation with the user,
   configure directivity of the multiple microphones based on the determination of the speaker,
   obtain audio from at least one of the multiple microphones for detecting an audio through the multiple microphones according to a distance and a direction, based on the configured directivity,
   obtain a first image including a mouth shape of the counterpart from the at least one first cameras, a second image including a mouth shape of the user from the at least one second camera, and a third image including a gaze of the user from the at least one third camera,
   when the user is determined to be a speaker associated with an utterance for performing a function based on the obtained audio and the obtained first, second, and third images, perform deep learning by matching an audio of the user and the mouth shape of the user and perform a function according to an utterance of the user based on the deep learning, and
   when the counterpart is determined to be the speaker associated with an utterance for performing a function based on the obtained audio and the obtained first, second, and third images, perform deep learning by matching an audio of the counterpart and the mouth shape of the counterpart and perform a function according to an utterance of the counterpart based on the deep learning.

2. The head mounted electronic device of claim 1, wherein the instructions, when executed by the at least one processor, individually and/or collectively, cause the head mounted electronic device to determine a conversation counterpart to whom the gaze of the user is directed based on the third image based on the speaker being the counterpart, or the user and the counterpart.

3. The head mounted electronic device of claim 1, wherein the instructions, when executed by the at least one processor, individually and/or collectively, cause the head mounted electronic device to:
   configure the multiple microphones to face the user based on the speaker being the user, and
   configure the multiple microphones to face the counterpart based on the speaker being the counterpart, or the user and the counterpart.

4. The head mounted electronic device of claim 1, wherein the instructions, when executed by the at least one processor, individually and/or collectively, cause the head mounted electronic device to:
   perform a voice command according to a content of the utterance of the user or display the content of the utterance of the user through a display of the head mounted electronic device.

5. The head mounted electronic device of claim 1, wherein the instructions, when executed by the at least one processor, individually and/or collectively, cause the head mounted electronic device to:
   convert the utterance of the counterpart into a text to be displayed through the display of the head mounted electronic device, or translate the utterance of the counterpart and output the translated text as an audio or display the translated text through the display.

6. The head mounted electronic device of claim 1, wherein the instructions, when executed by the at least one processor, individually and/or collectively, cause the head mounted electronic device to:
perform deep learning by matching the audio of the counterpart and the mouth shape of the counterpart based on the speaker being the user and the counterpart,
perform deep learning with respect to the mouth shape of the user, and
perform respective functions according to the utterance of the counterpart and the utterance of the user based on the deep learning.

7. The head mounted electronic device of claim 6, wherein the instructions, when executed by the at least one processor, individually and/or collectively, cause the head mounted electronic device to:
utilize the audio of the counterpart among the obtained audio for speech recognition, and to not utilize the audio of the user for speech recognition based on the user and the counterpart making a simultaneous utterance.

8. A method of operating an head mounted electronic device, the method comprising:
determining whether at least one of a user wearing the head mounted electronic device or a counterpart having a conversation with the user is a speaker who makes an utterance using at least one of multiple cameras arranged at different positions, wherein the multiple cameras comprise:
at least one first camera obtaining an image of object in a direction toward which a user's face is oriented, when the user wears the head mounted electronic device,
at least one second camera obtaining an image including at least a portion of the user's mouth, when the user wears the head mounted electronic device, and
at least one third camera tracking a gaze of the user, when the user wears the head mounted electronic device;
configuring directivity of at least one of multiple microphones arranged at different positions, based on the determination of the speaker;
obtaining audio from at least one of the multiple microphones for detecting an audio through the multiple microphones according to a distance and a direction, based on the configured directivity;
obtaining a first image including a mouth shape of the counterpart from at least one first cameras, a second image including a mouth shape of the user from the at least one second camera, and a third image including a gaze of the user from the at least one third camera; and
when the user is determined to be a speaker associated with an utterance for performing a function based on the obtained audio and the obtained first, second, and third images, performing deep learning by matching an audio of the user and the mouth shape of the user and perform a function according to an utterance of the user based on the deep learning, and
when the counterpart is determined to be the speaker associated with an utterance for performing a function based on the obtained audio and the obtained first, second, and third images, performing deep learning by matching an audio of the counterpart and the mouth shape of the counterpart and perform a function according to an utterance of the counterpart based on the deep learning.

9. The method of claim 8, further comprising:
determining a conversation counterpart to whom the gaze of the user is directed based on the third image based on the speaker being the counterpart, or the user and the counterpart.

10. The method of claim 8, wherein the configuring comprises:
configuring the multiple microphones to face the user based on the speaker being the user; or
configuring the multiple microphones to face the counterpart based on the speaker being the counterpart, or the user and the counterpart.

11. The method of claim 8, wherein the processing comprises:
performing deep learning by matching the audio of the user and the mouth shape of the user based on the speaker being the user; and
performing a voice command according to a content of the utterance of the user or displaying the content of the utterance of the user through a display of the head mounted electronic device, based on the deep learning.

12. The method of claim 8,
wherein based on the speaker being the counterpart, the processing comprises:
performing deep learning by matching the audio of the counterpart and the mouth shape of the counterpart; and
performing a function according to the utterance of the counterpart based on the deep learning.

13. The method of claim 12, wherein the performing the function comprises:
converting the utterance of the conversation counterpart into a text to be displayed through the display of the electronic device; or
translating the utterance of the conversation counterpart and outputting the translated text as an audio or displaying the translated text through the display.

14. The method of claim 8, wherein the processing comprises:
based on the speaker being the user and the counterpart, performing deep learning by matching the audio of the counterpart and the mouth shape of the counterpart;
performing deep learning with respect to the mouth shape of the user; and
performing respective functions according to the utterance of the counterpart and the utterance of user based on the deep learning.

* * * * *